United States Patent [19]

Nagaura

[11] Patent Number: 4,607,496
[45] Date of Patent: Aug. 26, 1986

[54] METHOD OF HOLDING AND POLISHING A WORKPIECE

[76] Inventor: Yoshiaki Nagaura, No. 391-2, Tonoharu, Oaza Chikushino-shi, Fukuoka-ken, 818, Japan

[21] Appl. No.: 632,693

[22] Filed: Jul. 23, 1984

Related U.S. Application Data

[63] Continuation-in-part of Ser. No. 518,105, Jul. 28, 1983, abandoned.

[30] Foreign Application Priority Data

| Jul. 29, 1982 | [JP] | Japan | 57-134495 |
| Aug. 12, 1982 | [JP] | Japan | 57-141369 |
| Aug. 26, 1982 | [JP] | Japan | 57-149600 |
| Sep. 2, 1982 | [JP] | Japan | 57-154450 |

[51] Int. Cl.⁴ ............................................. F25D 17/02
[52] U.S. Cl. ................................... 62/64; 51/131.4; 62/293; 62/374; 269/7
[58] Field of Search ............... 269/7; 51/131.2, 131.3, 51/131.4; 62/62, 64, 293, 374

[56] References Cited

U.S. PATENT DOCUMENTS

| 2,629,230 | 2/1953 | Turner | 269/7 |
| 2,641,879 | 6/1953 | Dalrymple | 269/7 |
| 3,083,002 | 3/1963 | Lacy, Jr. | 269/7 |
| 3,342,652 | 9/1967 | Reisman et al. | 51/131.4 |
| 3,574,257 | 4/1971 | Du Bois | 269/7 |
| 4,132,037 | 1/1979 | Bonora | 51/131.4 |

*Primary Examiner*—Ronald C. Capossela
*Attorney, Agent, or Firm*—Staas & Halsey

[57] ABSTRACT

A method of holding an polishing a workpiece whereby a liquid such as water is applied between the workpiece and a support member and the liquid is frozen to secure the workpiece to the support member. A polishing member is positioned in contact with the workpiece in a grinding liquid and the polishing member and the workpiece are moved relative to each other to polish the workpiece. Grooves or through holes may be provided in a surface of the support member to hold the water or other suitable liquid. The liquid to be frozen further may be impregnated into a liquid absorbing material.

3 Claims, 14 Drawing Figures

METHOD OF HOLDING AND POLISHING A WORKPIECE

This application is a Continuation-In-Part of U.S. Ser. No. 518,105 filed on July 28, 1983 now abandoned.

BACKGROUND OF THE INVENTION

1. Field of the Invention

The present invention relates to a method of holding a workpiece to be worked precisely, and more particularly to a method of holding and publishing a workpiece on a workpiece holder of a driving member or the like for driving the workpiece, through utilization of freezing a material such as water or the like so that the workpiece can be securely retained on the holder while being worked in a grinding liquid.

2. Description of the Prior Art

Conventionally, for example, in the case of working of both surfaces of a silicon wafer with high precision, each surface of the wafer is held to a supporting surface or the like of a driving member through using organic adhesive.

In this case, however, the organic adhesive must have a certain thickness since too small a thickness of the adhesive may lead to loss of its adhesion due to limitation of its molecular structure and, in addition, since the adhesive is soft until it is hardened, the wafer cannot be held with its adhereing surface completely parallel to the supporting surface or the like. Therefore, the use of the adhesive poses a problem in terms of working precision. Moreover, the adhesive is hard to be peeled off and the wafer may be often damaged when peeling off the adhesive; this imposes limitations on machining of a large sized wafer. Furthermore, the adhesive is generally hardened by heating; however, this heat treatment causes thermal expansion of the air or other substances included in the adhesive. This also presents the problem that an extra stress may be applied to the wafer due to the difference in thermal expansion between the material of the wafer supporting surface or the like and the wafer.

SUMMARY OF THE INVENTION

It is therefore an object of the present invention to provide a method of holding and polishing a workpiece on a workpiece holder of a driving member or the like through utilization of the freezing effect of water or the like to securely retain the workpiece on the holder while the workpiece is being worked in an abrading or grinding liquid.

DESCRIPTION OF THE PREFERRED EMBODIMENTS

With reference to the drawings, an embodiment of the present invention will be described in detail.

Figure 1:
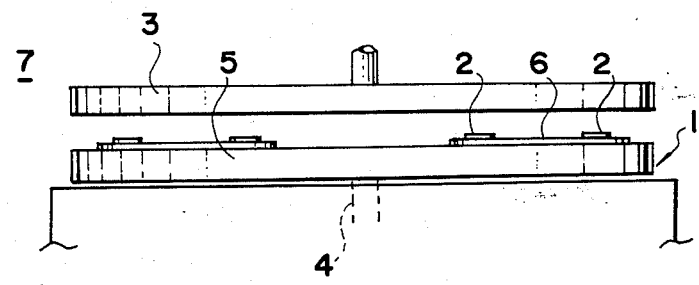
FIG. 1 is a schematic front view of a grinder embodying the present invention.

FIG. 1 is a front view showing a method of working a wafer which is a workpiece. Reference numeral 1 indicates generally a driving member; 2 denotes wafers; and 3 denotes a rotary disc, plate or other polising member.

Figure 2:
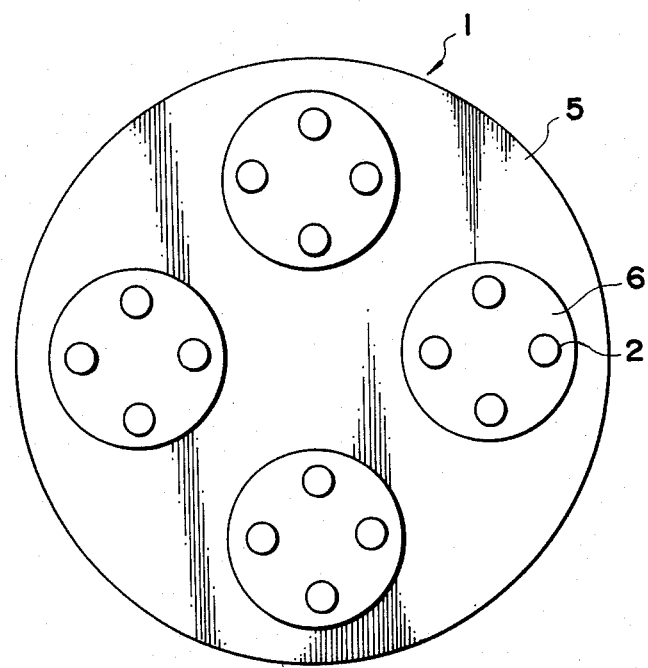
FIG. 2 is a schematic plan view, explanatory of how to support a wafer.

The driving member 1 comprises a drive shaft 4 to be driven by drive means (not shown) and a disc-shaped workpiece holder 5. As shown in FIG. 2, the workpiece holder 5 is provided with a plurality of protruding support members 6 spaced apart an equal angular distance and is fixedly mounted on the top end portion of the drive shaft 4 coaxially therewith.

The rotary disc 3 is disposed in opposing relation to the workpiece holder 5 of the driving member 1, and is rotatable about the axis that is concentric with the workpiece holder 5 and movable up and down along the axis.

The driving member 1 and the rotary disc 3 constitute a grinder as identified generally by 7.

The wafer 2 is held on each support member 6 as shown in FIGS. 1 and 2 according to a method of the present invention. This holding method will hereinbelow be described in detail.

Figure 3:
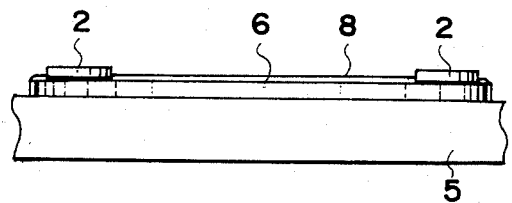
FIG. 3 is a schematic side elevational view explanatory of a method of freezing the wafer onto a support member.
Figure 4:
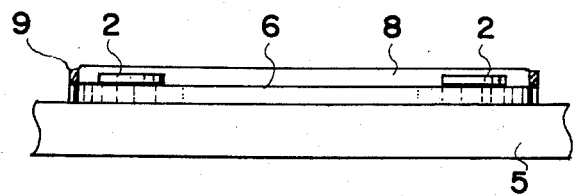
FIG. 4 is a schematic side elevational view explanatory of another method of freezing the wafer onto the support member.

For holding of the wafer 2, water 8 is first coated on the support member 6 as shown in FIG. 3 and then each wafer 2 is placed thereon. In this state, the wafer 2 adheres closely to the support member 6 through an extremely thin film of water (hereinafter, referred to as a water film). Then, by cooling at least the support member 6 and the surrounding portion down to about $-20°$ C., the water instantaneously turns into ice and the wafer 2 is frozen fast on the support member 6. In this case, since the wafer 2 is firmly held on the support member 6 through an extremely thin film of ice having a hexagonal crystalline sturcture measuring 4 Å by 7 Å, the top surface of the wafer 2 can be held in parallel to the surface of the support member 6. This is a solution to the problem encountered in the prior art using an adhesive binder.

An appropriate pressure may be applied to the wafer 2 for its closer adhesion to the support member 6 after it is placed on the support member 6. It is also possible, of course, to wet the underside of the wafer 2 alone or both the underside of the wafer 2 and the surface of the support member 6 with water before placing the former on the latter. Also it is possible to mount machinable ring 9 on the holding portion 5 for storing water 8 and to place the wafers 2 on the support members 6 in the water 8.

In this way, after the wafers 2 have been frozen hard on the support members 6 of the workpiece holder 5, the workpiece holder 5 and the rotary disc 3 are driven in such a manner as to rotate them relative to each other and, at the same time, the rotary disc 3 is brought down gradually and urged against the upper surfaces of the wafers 2 through an abrasive to abrade and thus polish or grind the upper surfaces of the wafers 2.

Figure 14:
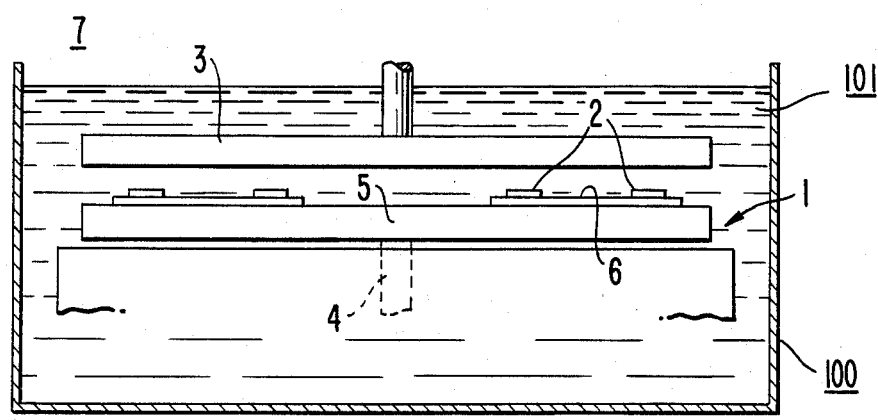

Preferably the polishing or grinding of the surfaces of the wafers is accomplished in a container 100 containing a suitable abrading or grinding liquid 101 as shown in FIG. 14. The grinding liquid should have a freezing point lower than the freezing point of water and preferably lower than the temperature of 20° C. at which the workpiece is frozen to the support member so that the temperature of the grinding liquid and the workpiece during working may be maintained at least as low as the temperature at which the workpiece is frozen to the support member to assure good retention of the workpiece. A suitable grinding liquid may be comprised of a mixed solution of nitric acid and fluoric acid since the freezing point of this solution is far lower than −20° C. while still providing good abrasion qualities. The wafer surfaces may be polished into mirror surfaces in the mixture of nitric cid and fluoric acid.

Dissolving the film of ice by electromagnetic waves or some other means, the wafers 2 can be easily removed from the support members 6 without imposing thereon any stress.

While in the above the rotary disc 3 is described to be disposed above the driving member 1, the former may also be placed under the latter. In such a case, the protruding support members 6 are detachably mounted on the workpiece holder 5 so that they may be mounted after the wafers 2 are frozen to the support members 6.

After completion of working the one side of each wafer 2, it is turned upside down and the other side is similarly frozen hard to the support member 6, and thereafter worked in a mixed solution as previously described.

In the working of both their sides, since the wafers 2 are firmly held on the support members through a extremely thin film of ice, both sides can be worked with high precision and with excellent parallelism.

Although the present invention has been described as being applied to the working of both sides of the wafer, the invention is also applicable to high-precision working of both sides of, for example, thin sheet glass for masking, ferrite, crystal, a semiconductor substrate, metal plate, lens-like body, or the like other than the wafer.

In the above-described example, a thin, flat workpiece is frozen on the flat surface of the support member 6. But when the surfaces to be frozen to each other are mirror-surfaces, adjustment of contacting pressure is required to obtain a uniform thin film of ice, introducing difficulty in the work. This problem can be solved by the employment of such means as shown in FIGS. 5 to 11. That is to say, by further providing means such as grooves or holes shown in FIGS. 5 to 11, a workpiece can be stuck without forming any frozen layer between the surface of support member and the workpiece, permitting them to closely adhere to each other.

Figure 5:
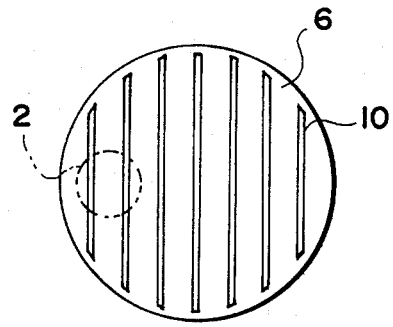
FIG. 5 is a schematic plan view explanatory of the formation of straight grooves in the surface of the support member.
Figure 6:
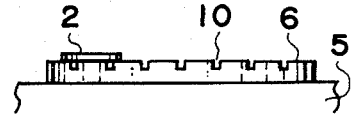
FIG. 6 is a cross-sectional view of FIG. 5.

Referring now to FIGS. 5 and 6, a plurality of parallel grooves 10 are cut in the surface of the support member 6. In this case, the water on the support member 6 slightly swells from the grooves 10 due to surface tension, and these swelled portions are pressed by the wafer 2 to form a water film layer and then frozen. FIG. 6 shows a cross sectional view of FIG. 5.

Figure 7:
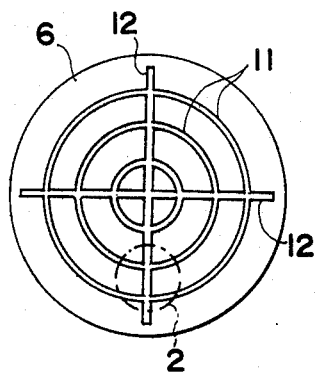
FIGS. 7 and 8 are schematic plan views explanatory of the formation of grooves of other shapes in the surface of the support member.
Figure 8:
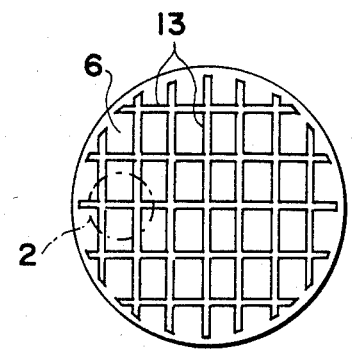

In the case of FIG. 7, a plurality of coaxial circumferential grooves 11 and a cross-shaped groove 12 are cut in the surface of the support member 6. In the case of FIG. 8, a number of straight grooves 13 are cut in a matrix form in the surface of the support member 6. Both structures provide the same functions and effects as those obtainable with the structure of FIG. 5. In these cases, by setting the capacities of the grooves to be relatively large, it is possible to prevent the frozen layer from dissolving by the heat that will be produced during working of workpieces, thereby ensuring to maintain a sufficient retaining force.

Figure 9:
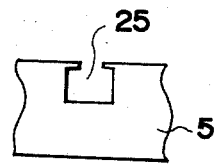
FIG. 9 is a cross-sectional view showing an example of the groove.

FIG. 9 shows an example of the cross sectional shape of the groove depicted in FIGS. 5, 7 and 8. In FIG. 9, reference numeral 25 designates a groove.

Figure 10:
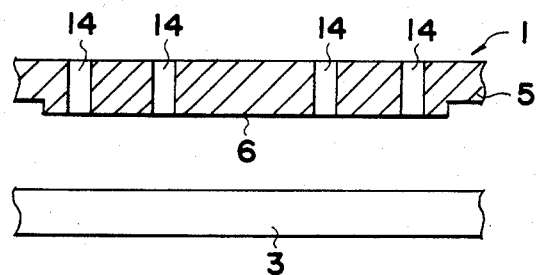
FIG. 10 is a schematic partial view showing the formation of through holes in the support member.
Figure 11:
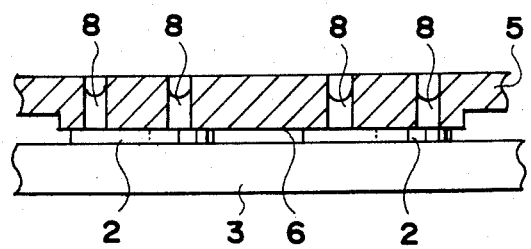
FIG. 11 is a schematic view showing freezing of the wafer to the support member through using through holes.

Referring now to FIG. 10, the driving member 1 and the rotary disc 3 are reversely arranged with respect to FIG. 1. A plurality of through holes 14 are formed in each support member 6 of the workpiece holder 5 of the driving member 1. In this case, as shown in FIG. 11, the wafers 2 are mounted on the rotary disc 3 in the same manner as in FIG. 1 and the support members 6 are pressed against wafers 2 and then water 8 is injected into the through holes 14 for freezing. After completion of freezing, the rotary disc 3 and the workpiece holder 5 are driven in such a manner as to rotate them relative to each other, thereby working the wafers 2. In this case, it is possible to wet the surfaces of the wafers 2 with water, to form thin films of ice between the wafers 2 and the workpiece holder 5. In this case, too, by setting the volumes of the through holes to be comparatively large, dissolution of the iced layer during working can be prevented as previously mentioned.

While in the foregoing the present invention has been described in respect of the case of working a plate-like workpiece, the invention may be applied to the working of workpieces of other shapes. Next, a description will be given, with reference to FIGS. 12 and 13, of freezing and working operations in such a case.

Figure 12:
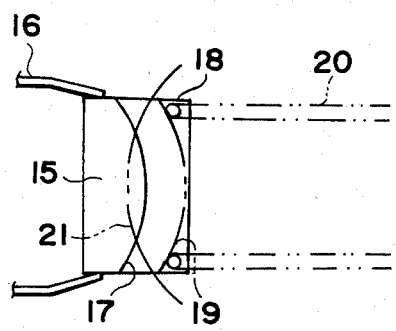
FIGS. 12 and 13 are schematic diagrams respectively showing other examples of the application of this invention method to workpieces of other shapes and FIG. 14 is a schematic front view of a grinder in a container having a grinding liquid therein according to the present invention.

FIG. 12 shows the case of obtaining a crystal oscillator element of a very small diameter by working both sides of a crystal blank into spherical surfaces. A crystal blank 15 is first held by a holder 16 and one surface of the blank 15 is worked into a spherical surface 17 by rotating the holder 16. Then, a machinable piece 18 is mounted and frozen fast on the spherical surface 17. In this case, the workpiece holding surface of the machinable piece 18 is preformed to conform to the spherical surface 17. Then the outer surface of the machinable piece 18 is worked into a spherical surface 19, and the spherical surface 19 is transferred to a vacuum chuck 20 which is disposed opposite to the holder 16 coaxially therewith. Finally, the other surface of the blank 15 is worked into a spherical surface 21, and then the frozen layer is melted to obtain a product. Conventionally, in case of performing this kind of work, the machinable piece 18 is stuck to the spherical surface 17 through adhesive, so that when the working operation reaches the adhesive, there is such a problem that the adhesive could be peeled off resulting in the blank 15 being disconnected from the machinable piece. However, such a problem will not occur in case of freezing the machinable piece 18 fast to the blank 15. In this example, when the holder 16 and the vacuum chuck 20 are arranged side by side as shown in FIG. 12, water on the spherical surface 17 or the like for freezing may sometimes drip, failing to obtain a uniform film of ice. This can be avoided by sticking a mosiure absorbing sheet, such as a water bearing thin cloth or the like, onto the spherical surface 17 and to press the machinable piece thereto.

Figure 13:
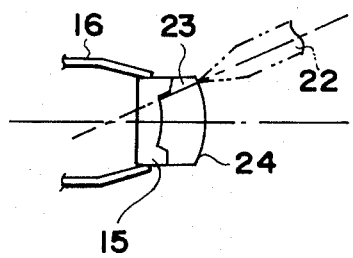

FIG. 13 shows a modification of the example of FIG. 12, in which the shape into which the blank 15 is worked is different from that in the example of FIG. 12. First, one surface of the blank 15 is worked by a curve generator 22 into such a shape as shown in FIG. 13. Then a machinable piece 23 is frozen fast to the worked surface in the same way as in FIG. 12, thereafter being worked into a spherical surface 24. The subsequent operations are exactly the same as those described previously in connection with FIG. 12.

Although the foregoing description has referred to using water for freezing, it is also possible to employ methyl alcohol, liquid nitrogen, liquid oxygen or the like in place of water. In other words, any materials can be utilized by which would provide sufficient retention by freezing at low temperatures.

With such an arrangement as described in the foregoing, the present invention produces the following various excellent effects:

(1) Since a workpiece is frozen hard on the support member, sufficient retention can be obtained. Further, it is also possible to solve the problem of occurrence of stress due to expansion of the air in case of the conventional method using adhesive. Moreover, the frozen film will not be peeled off by working and the workpiece is securely held.

(2) Since water is instantly frozen into a film, the time for retention can markedly be reduced.

(3) Since a workpiece can be removed by merely melting the frozen film, the work is very easy and simple. Moreover, it is possible to solve the problem of damage of a workpiece in the conventional method using adhesive. A large sized workpiece can be also worked. There is no need to clean after removing the workpiece. Furthermore, a body having a ultramicro-diameter can be removed.

(4) Since the frozen film is extremely thin, both surfaces of a flat plate-like workpiece can be worked with high-precision parallelism.

(5) Since the frozen film can easily be dissolved, there is no possibility of clogging grooves and holes formed in the support member. Accordingly, grooves and holes can be used so that the workpiece may adhere closely to the workpiece holder.

(6) Even in the case where a water film is hard to be formed, the workpiece can be frozen fast to the workpiece holder through a water-impregnated sheet.

It will be apparent that many modifications and variations may be effected without departing from the scope of the novel concepts of the present invention.

What is claimed is:

1. A method of holding and working a workpiece comprising the steps of:
   providing a freezable liquid impregnated material between a workholder and the workpiece;
   freezing the liquid impregnated in the material to secure the workpiece to the workholder; and
   working the workpiece.

2. A method of holding and working a workpiece comprising the steps of placing the workpiece on a workholder having a plurality of holes extending all the way through the workholder;
   injecting a freezable liquid into the holes;
   freezing the liquid to secure the workpiece to the workholder; and
   working the workpiece.

3. A method of holding and working a workpiece, comprising the steps of:
   providing a layer of a freezable liquid on a workholder;
   immersing the workpiece into the layer of freezable liquid whereby the workpiece is covered with the liquid;
   freezing the layer of liquid to secure the workpiece to the workholder;
   working through the frozen layer of liquid overlying the workpiece until a surface of the workpiece is exposed; and
   working the workpiece.

* * * * *

UNITED STATES PATENT AND TRADEMARK OFFICE
CERTIFICATE OF CORRECTION

PATENT NO. : 4,607,496
DATED : Aug. 26, 1986
INVENTOR(S) : NAGAURA

It is certified that error appears in the above-identified patent and that said Letters Patent is hereby corrected as shown below:

[57] ABSTRACT
   Line 1, "an" should be --and--.

Col. 1
Line 10, after "holding" insert --and polishing--;
Line 12, "publishing" should be --polishing--;
Line 29, "adhereing" should be --adhering--.

Col. 2
Line 13, after "shapes" insert --;--.

Signed and Sealed this

Second Day of December, 1986

*Attest:*

DONALD J. QUIGG

*Attesting Officer*  *Commissioner of Patents and Trademarks*